United States Patent
Kihara et al.

(10) Patent No.: US 7,543,560 B2
(45) Date of Patent: Jun. 9, 2009

(54) CYLINDER DIRECT GASOLINE INJECTION TYPE INTERNAL COMBUSTION ENGINE, CONTROL EQUIPMENT THEREOF, AND INJECTOR

(75) Inventors: Yusuke Kihara, Hitachinaka (JP); Yoshihiro Sukegawa, Hitachi (JP); Kenji Tsuchita, Hitachiota (JP); Atsushi Sekine, Hitachinaka (JP); Hiroshi Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/545,547

(22) Filed: Oct. 11, 2006

(65) Prior Publication Data
US 2007/0079797 A1    Apr. 12, 2007

(30) Foreign Application Priority Data
Oct. 12, 2005    (JP) .............................. 2005-297974

(51) Int. Cl.
*F02B 3/00*    (2006.01)

(52) U.S. Cl. ....................... 123/298; 123/305
(58) Field of Classification Search ................ 123/298, 123/276, 295, 299, 300, 305, 467, 309; 239/533.12
See application file for complete search history.

(56) References Cited

U.S. PATENT DOCUMENTS

| 6,802,296 | B2 | 10/2004 | Arndt et al. | |
| 6,883,491 | B2 * | 4/2005 | Arndt et al. | 123/305 |
| 7,021,274 | B2 * | 4/2006 | Nakayama et al. | 123/294 |
| 7,165,526 | B2 * | 1/2007 | Nakayama et al. | 123/298 |
| 7,216,624 | B2 * | 5/2007 | Mizobuchi et al. | 123/305 |
| 2004/0011326 | A1 * | 1/2004 | Yamashita et al. | 123/305 |
| 2006/0157018 | A1 * | 7/2006 | Nakayama et al. | 123/298 |
| 2007/0068482 | A1 * | 3/2007 | Yamashita et al. | 123/276 |

FOREIGN PATENT DOCUMENTS

CN    1440491 A    9/2003

(Continued)

OTHER PUBLICATIONS

Dr.-Ing. P. Wolters et al. "Die Naechste Generation von Otto-Di Brennverfahren; The Next generation of Gasoline Direct Injection Engine Technology", Aachener Kolloquium Fahrzeug-und Motorentechnik, 2001, pp. 773-789, XP001093151.

(Continued)

*Primary Examiner*—Hai H Huynh
(74) *Attorney, Agent, or Firm*—Crowell & Moring LLP

(57) ABSTRACT

To balance ignition retard for reduction in exhaust and increase in exhaust gas temperature at a start of cooling, and increased output under a full open condition. There are provided an upward spray that forms airflow toward an electrode portion of an ignition plug at a start of cooling, a central spray oriented toward the electrode portion of the ignition plug by the airflow by the upward spray, and lateral sprays that prevent fuel from adhering to a wall surface under a full open condition and form uniform air/fuel mixture.

14 Claims, 12 Drawing Sheets

FOREIGN PATENT DOCUMENTS

| | | | |
|---|---|---|---|
| CN | 1554862 A | | 12/2004 |
| EP | 1 316 697 A1 | | 6/2003 |
| JP | 7-63061 A | | 3/1995 |
| JP | 2005-98117 | * | 4/2005 |
| JP | 2005-098118 A | | 4/2005 |
| JP | 2005-098120 A | | 4/2005 |
| JP | 2005-273554 | * | 10/2005 |
| JP | 2006-257943 | * | 9/2006 |
| JP | 2007-92633 | * | 4/2007 |
| WO | WO 02/095201 A1 | | 11/2002 |

OTHER PUBLICATIONS

European Search Report dated Jan. 22, 2007 (Six (6) Pages).
Chinese Office Action dated Jan. 25, 2008 including English translation (Six (6) pages).

* cited by examiner (a)

(b)

CYLINDER DIRECT GASOLINE INJECTION TYPE INTERNAL COMBUSTION ENGINE, CONTROL EQUIPMENT THEREOF, AND INJECTOR

CROSS REFERENCE TO RELATED APPLICATIONS

This application claims priority to JP 2005-297974, filed Oct. 12, 2005, the contents of which are incorporated herein in their entirety.

BACKGROUND OF THE INVENTION (1) Field of the Invention

The present invention relates to a cylinder direct gasoline injection type internal combustion engine (spark ignition type internal combustion engine), control equipment thereof, and an injector. More particularly, the present invention relates to a cylinder direct gasoline injection type internal combustion engine that directly injects fuel into a combustion chamber with a multi-hole injector having a plurality of injection holes, control equipment thereof, and an injector.

(2) Description of Related Art

In a known cylinder direct gasoline injection type internal combustion engine, a multi-hole injector having a plurality of injection holes is used to inject fuel from the injection holes to orient a fuel injection direction so that a plurality of sprays of fuel sandwich an electrode of an ignition plug in a cylinder, fuel injection timing is set to a compression stroke to perform stratified combustion (lean combustion), and the fuel injection timing is set to a medium term of an intake stroke in uniform combustion, thereby making air/fuel mixture uniform (for example, JP-A-2005-98120).

In a cylinder direct gasoline injection type internal combustion engine in which an injection direction of fuel injected from a multi-hole injector is oriented near an ignition plug, fuel injection is performed in an intake stroke, and uniform air/fuel mixture is formed in a cylinder to ensure fuel ignitability at a start of cooling (for example, JP-A-2005-98118).

BRIEF SUMMARY OF THE INVENTION

In terms of cleaning of exhaust gas of an engine, a catalyst of an exhaust system is inactive at a start of cooling of the engine, and thus exhaust gas from the engine is exhausted as it is, which increases loads to the environment. In this respect, there is proposed a cylinder direct gasoline injection type internal combustion engine in which an injection direction of fuel injected from a multi-hole injector is oriented near an ignition plug, fuel injection is performed in an intake stroke, uniform air/fuel mixture is formed in a cylinder, and ignition timing is retarded within a range of stable combustion, thereby early increasing exhaust temperature to reduce exhaust of unburned fuel and early activate a catalyst.

From a further demand for reducing exhaust of unburned fuel, a method receives attention of injecting fuel once or several times from a late stage of a compression stroke to an early stage of an expansion stroke, stratifying the fuel near an ignition plug, and significantly retarding ignition timing (ignition retard). This early increases exhaust gas temperature after a start of cooling, and early activation of a catalyst can significantly reduce exhaust of unburned fuel.

When ignition retard is performed in fuel injection with a multi-hole injector, a spray of fuel is oriented near an ignition plug, and combustible air/fuel mixture is distributed around an electrode portion of the ignition plug to perform ignition.

At this time, in order to retard ignition timing, injection timing of fuel needs to be also retarded in synchronization with ignition, and a large percentage of fuel needs to be directed to the plug for stable ignition.

In full throttle open operation, however, injected fuel needs to be vaporized to form uniform air/fuel mixture for obtaining high output, but if a large amount of spray of fuel is oriented to the electrode portion of the ignition plug, a large amount of fuel adheres to a wall surface facing the injector, which prevents vaporization of fuel and reduces output.

The present invention is achieved in view of the problem to be solved, and has an object to provide a cylinder direct gasoline injection type internal combustion engine that allows and balances early increase in exhaust gas temperature by ignition retard at a start of cooling, and high output in full throttle open operation, with spray specifications and injection control, control equipment thereof, and an injector.

In order to achieve the object, the present invention provides a cylinder direct gasoline injection type internal combustion engine that directly injects fuel into a combustion chamber, including: an injector that injects fuel into the combustion chamber on an intake side of the combustion chamber, wherein the injector includes: an upward spray injection hole for generating an upward spray oriented below an electrode portion of an ignition plug; a central spray injection hole for generating a central spray oriented closer to a piston than the upward spray and substantially immediately below the upward spray; and a plurality of lateral spray injection holes for generating a plurality of lateral sprays around the central spray and oriented outside a range of operation of an intake valve.

In the cylinder direct gasoline injection type internal combustion engine according to the present invention, the upward spray preferably does not collide with a piston crown surface as compared with the central spray, is generated closer to the electrode portion of the ignition plug, and generates airflow faster than airflow by the central spray.

In the cylinder direct gasoline injection type internal combustion engine according to the present invention, the plurality of lateral spray injection holes preferably generate a lateral spray oriented between the upward spray and the central spray, and a lateral spray oriented between the central spray and the piston crown surface.

In the cylinder direct gasoline injection type internal combustion engine according to the present invention, the lateral sprays are preferably oriented to target a crown surface outer periphery of the piston.

In the cylinder direct gasoline injection type internal combustion engine according to the present invention, the upward spray is preferably constituted by one spray of fuel injected from one upward spray injection hole.

In the cylinder direct gasoline injection type internal combustion engine according to the present invention, the upward spray is preferably constituted by a plurality of sprays of fuel injected from a plurality of upward spray injection holes.

In the cylinder direct gasoline injection type internal combustion engine according to the present invention, the upward spray is preferably constituted by a spray of fuel that does not collide with a cylinder head.

In the cylinder direct gasoline injection type internal combustion engine according to the present invention, the central spray is preferably constituted by one spray of fuel injected from one central spray injection hole.

In the cylinder direct gasoline injection type internal combustion engine according to the present invention, the central spray is preferably constituted by a plurality of sprays of fuel injected from a plurality of central spray injection holes.

In the cylinder direct gasoline injection type internal combustion engine according to the present invention, a piston having a piston crown surface formed with a step that is low on an intake side and high on an exhaust side is preferably used below the electrode portion of the ignition plug.

In the cylinder direct gasoline injection type internal combustion engine according to the present invention, a piston having a piston crown surface formed with a convex portion is preferably used below the electrode portion of the ignition plug.

In order to achieve the object, the present invention provides control equipment of the cylinder direct gasoline injection type internal combustion engine according to the above described invention, wherein the control equipment controls fuel injection timing so that the fuel injection timing is set to a range between 30 degrees before compression top dead center and the compression top dead center at a start of cooling, and set to a range between 90 degrees before and after intake top dead center after warming-up.

In order to achieve the object, the present invention provides an injector for a cylinder direct gasoline injection type internal combustion engine that directly injects fuel into a combustion chamber, including: an upward spray injection hole for generating an upward spray oriented below an electrode portion of an ignition plug; a central spray injection hole for generating a central spray oriented closer to a piston than the upward spray and substantially immediately below the upward spray; and a lateral spray injection hole for generating a lateral spray around the central spray and oriented outside a range of operation of an intake valve.

According to the cylinder direct gasoline injection type internal combustion engine of the present invention, under a condition at a start of cooling, airflow generated by the upward spray causes the air/fuel mixture from the central spray to be carried to the electrode portion of the ignition plug, the air/fuel mixture is ignited to allow ignition retard at the start of cooling and early increase in exhaust gas temperature. A small amount of fuel may be oriented below the ignition plug, which prevents reduction in output by fuel adhering to a wall surface under a full open condition, thereby reducing exhaust of unburned fuel by early increase in exhaust gas temperature at the start of cooling, and balancing early activation of a catalyst and high output operation under the full open condition.

Other objects, features and advantages of the invention will become apparent from the following description of the embodiments of the invention taken in conjunction with the accompanying drawings.

DETAILED DESCRIPTION OF THE INVENTION

Embodiments of a cylinder direct gasoline injection type internal combustion engine, control equipment thereof, and an injector according to the present invention will be described in detail with reference to the accompanying drawings.

FIGS. 1 to 12 show a first embodiment of a cylinder direct gasoline injection type internal combustion engine according to the present invention.

Figure 1:
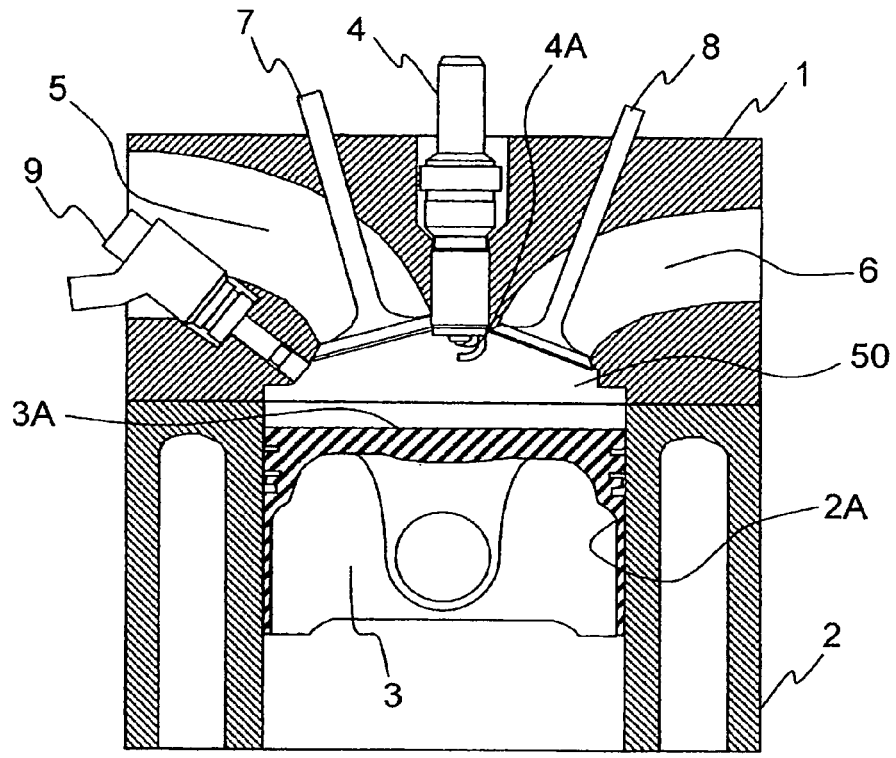
FIG. 1 is a vertical sectional view of an engine body of a first embodiment of a cylinder direct gasoline injection type internal combustion engine according to the present invention.

As shown in FIG. 1, the cylinder direct gasoline injection type internal combustion engine includes a cylinder head 1 and a cylinder block 2, and a piston 3 is reciprocatively provided in a cylinder bore 2A formed in the cylinder block 2. An upper end of the cylinder bore 2A is closed by the cylinder head 1, and a combustion chamber 50 is formed between the cylinder head 1 and the piston 3. In the embodiment, a piston 3 having a flat crown surface 3A is used.

An ignition plug 4 is mounted to the cylinder head 1. A spark discharge electrode portion 4A of the ignition plug 4 is placed in the combustion chamber 50 and in a diametrically central position of the combustion chamber 50.

An intake port 5 and an exhaust port 6 opening into the combustion chamber 50 are formed in the cylinder head 1. In FIG. 1, the intake port 5 is placed on the left of the ignition plug 4, and the exhaust port 6 is placed on the right of the ignition plug 4. Thus, the left of the ignition plug 4 is referred to as an intake side, and the right of the ignition plug 4 is referred to as an exhaust side.

An intake valve 7 that opens and closes the intake port 5 and an exhaust valve 8 that opens and closes the exhaust port 6 are provided in the cylinder head 1. The intake valve 7 and the exhaust valve 8 are opened and closed according to a piston phase (a crank angle) by an unshown known valve operating mechanism.

A multi-hole injector (a fuel injection valve) 9 that directly injects fuel into the combustion chamber 50 is mounted to the intake side of the combustion chamber 50. As shown in FIG. 2A, the multi-hole injector 9 includes a multi-hole plate 9C at a tip of a nozzle body 9A including a needle 9B, and as shown in FIG. 2B, a plurality of (six in the embodiment) injection holes 13a to 13f are formed in a circumference of the multi-hole plate 9C. The injection hole 13a is intended for an upward spray, the injection hole 13b is intended for a central spray, and the injection holes 13c to 13f are intended for lateral sprays.

Specifically, the upward spray injection hole 13a, the central spray injection hole 13b, and the plurality of lateral spray injection holes 13c to 13f are formed in the multi-hole plate 9C of the injector 9.

Figure 3:
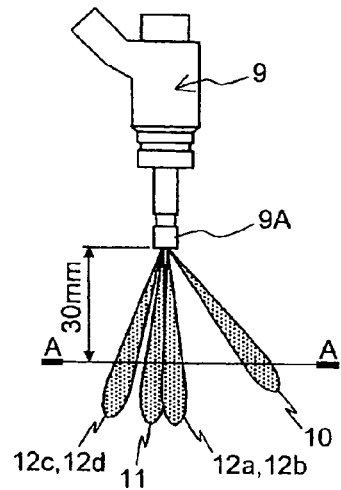
FIG. 3 illustrates appearance shapes of sprays in the first embodiment.
Figure 4:
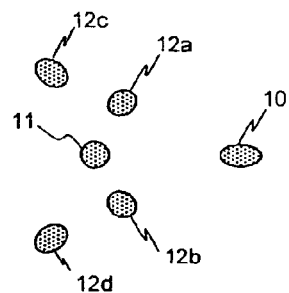
FIG. 4 illustrates horizontal sectional shapes of the sprays in the first embodiment.

FIGS. 3 and 4 show appearance shapes of sprays of fuel when the fuel is injected from the multi-hole injector 9 into a free space where ambient pressure is atmospheric pressure at fuel pressure of 11 MPa. FIG. 3 shows shapes of sprays when the multi-hole injector 9 is seen from a lateral side, and FIG. 4 shows shapes of sprays in a section taken along the line A-A in FIG. 3, 30 mm below the injection holes 1 ms after the fuel injection.

In FIGS. 3 and 4, reference numeral 10 denotes an upward spray from the injection hole 13a, reference numeral 11 denotes a central spray from the injection hole 13b, and reference numerals 12a to 12d denote lateral sprays from the injection holes 13c to 13f.

Figure 7:
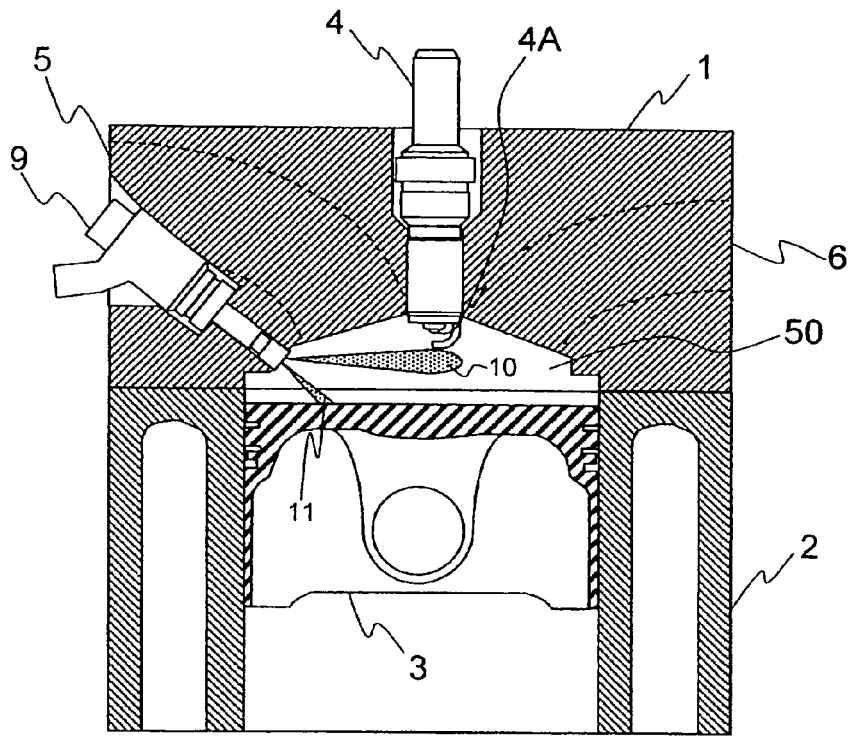
FIG. 7 illustrates a state immediately after fuel injection in the first embodiment.
Figure 11:
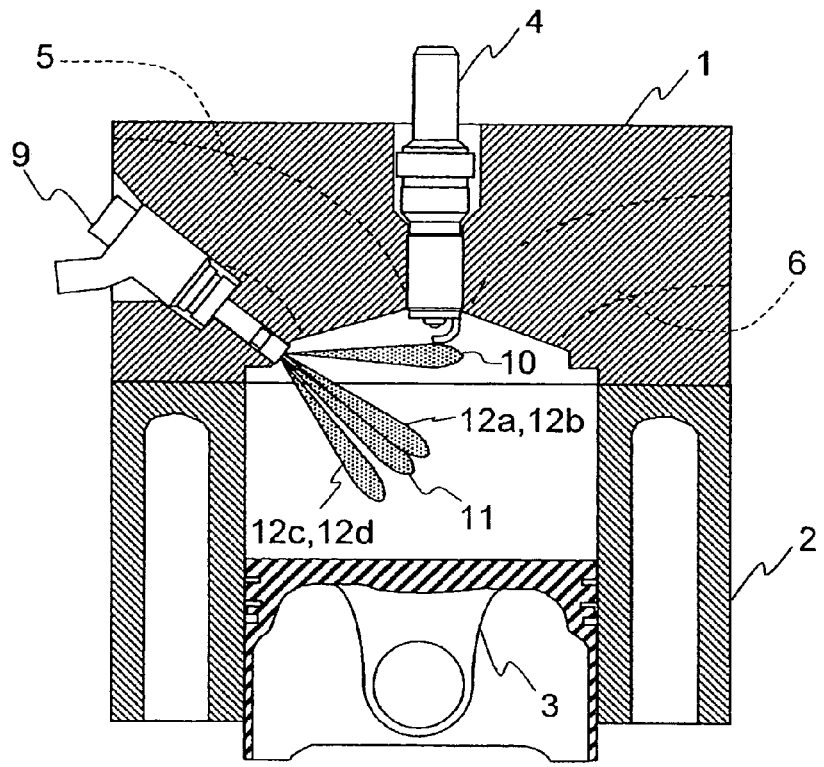
FIG. 11 illustrates a state of the air/fuel mixture under a full open condition in the first embodiment.

The multi-hole injector 9 is placed so that the upward spray 10 from the injection hole 13a is placed on an upper side of the combustion chamber 50 (a side of the cylinder head 1) and closer to the ignition plug 4 (see FIGS. 7 and 11).

The upward spray 10 from the injection hole 13a is oriented below the electrode portion 4A of the ignition plug 4, the central spray 11 from the injection hole 13b is oriented closer to the piston 3 than the upward spray 10 and immediately below the upward spray 10. Thus, the upward spray 10 does not collide with the piston crown surface 3A as compared with the central spray 11, is generated closer to the electrode portion 4A of the ignition plug 4, and generates airflow faster than airflow by the central spray 11.

Among the injection holes 13c to 13f of the plurality of lateral sprays, the injection holes 13c and 13d generate lateral sprays 12a and 12b oriented between the upward spray 10 and the central spray 11, and the injection holes 13e and 13f generate lateral sprays 12c and 12d oriented between the central spray 11 and the piston crown surface 3A.

Figure 5:
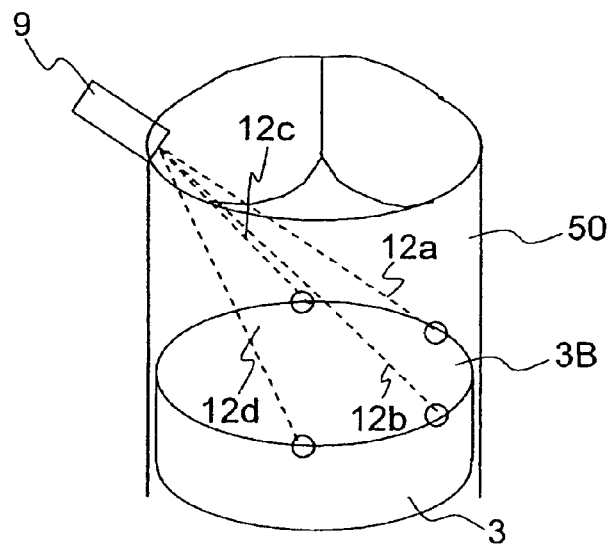
FIG. 5 illustrates target positions of lateral sprays in the first embodiment.

FIG. 5 shows directions of the lateral sprays 12a to 12d in a state of the piston at 90 degrees ATDC. As shown in FIG. 5, the lateral sprays 12a to 12d each are oriented to target a crown surface outer periphery 3B of the piston 3.

Now, a method for checking the shapes of the sprays as shown in FIGS. 3 and 4 will be described below.

Fuel to be injected is desirably gasoline actually injected in the engine, but a fluid having the same property as gasoline may be used. The fuel is increased in pressure to 11 MPa, and injected into a container in which ambient pressure is atmospheric pressure. The container needs to have a window through which a sheet light of about 5 mm thick can be let in, and a window that allows the sprays to be photographed by a high speed camera.

An injection pulse from fuel injection to finish is 1 ms, and a drive pulse signal is provided to the injector to inject the fuel. Then, sprays 1 ms after the injection may be photographed in synchronization with the drive pulse signal. Any light source may be used as long as it clarifies the shapes of the sprays.

Figure 6:
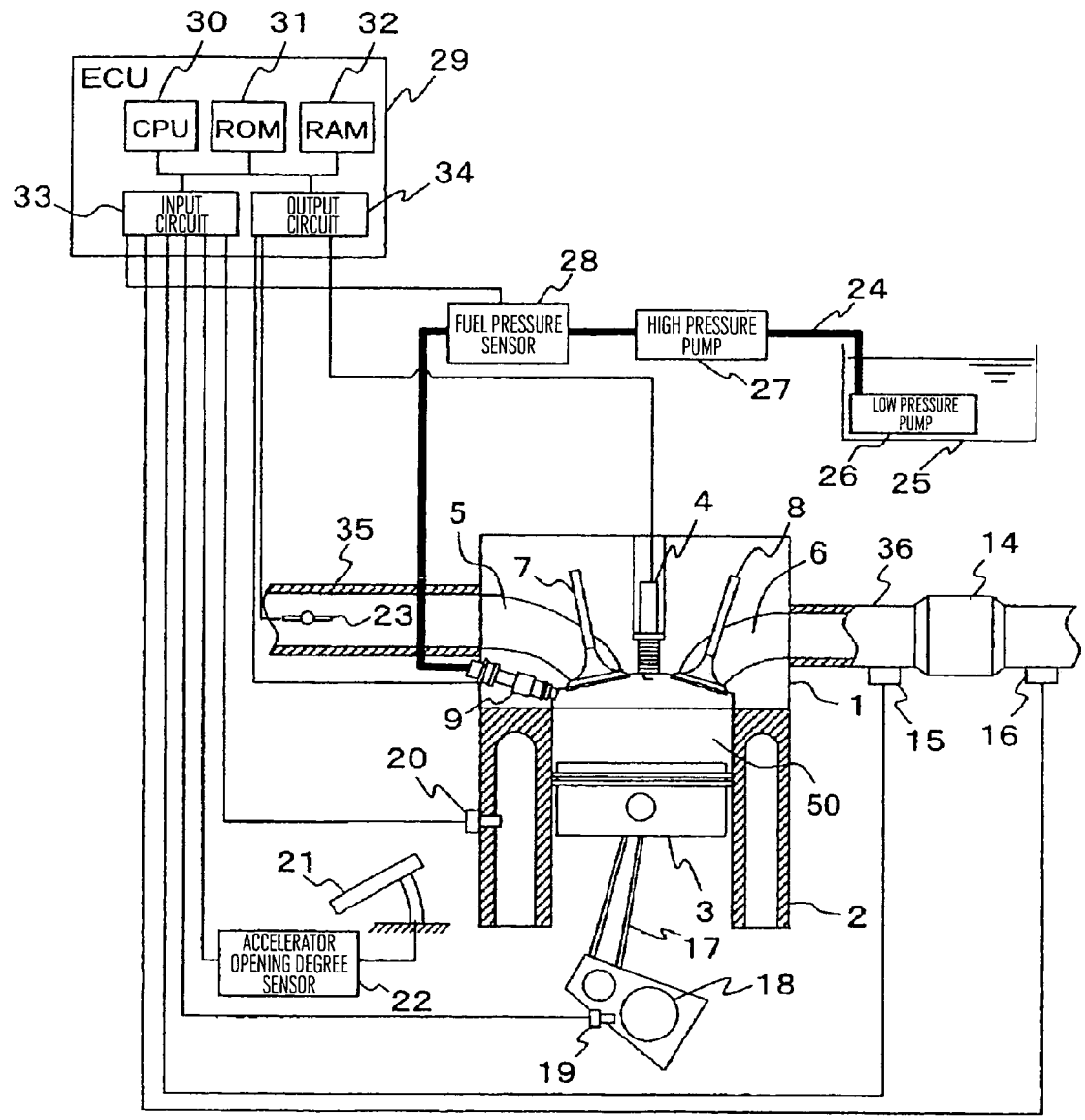
FIG. 6 illustrates a system configuration of the entire cylinder direct gasoline injection type internal combustion engine according to the present invention.

Now, a system configuration of the entire engine will be described with reference to FIG. 6. The piston 3 is connected to a crankshaft 18 via a connecting rod 17. A crank angle sensor 19 that can detect a crank angle and an engine rpm is placed in the crankshaft 18. A water temperature sensor 20 that detects temperature of cooling water is placed in the cylinder block 2. An accelerator opening degree sensor 22 that detects an accelerator pedal depression amount by a driver is connected to an accelerator pedal 21.

A throttle valve 23 that adjusts an intake air amount is provided in an intake pipe 35 communicating with the intake port 5. An airflow sensor (not shown) that detects the intake air amount is provided upstream of the throttle valve 23.

A three way catalyst 14 is provided in an exhaust pipe 36 communicating with the exhaust port 6. An air/fuel ratio sensor 15 is provided upstream of the three way catalyst 14, and an $O_2$ sensor 16 is provided downstream of the three way catalyst 14.

Fuel in a fuel tank 25 is subjected to primary pressurization by a low pressure pump 26, fed to a high pressure pump 27 by a fuel pipe 24, subjected to secondary pressurization (pressurization with high pressure) by a high pressure pump 27, and supplied to the multi-hole injector 9. Pressure of the fuel subjected to the secondary pressurization by the high pressure pump 27 is detected by a fuel pressure sensor 28.

An electronic control unit (ECU) 29 includes a central processing unit (CPU) 30 for executing arithmetical operations according to set programs, a read-only memory (ROM) 31 for storing control programs or data required for the arithmetical operations, a random-access memory (RAM) 32 for temporarily storing arithmetical operation results, an input circuit 33 that receives signals from the sensors, and an output circuit 34 that transmits signals to devices according to the arithmetical operation results.

The electronic control unit (ECU) 29 performs fuel injection control, ignition timing control, or the like. For the fuel injection control, in addition to fuel injection amount control, fuel injection timing is controlled so that the fuel injection timing is set to a range between 30 degrees before compression top dead center and the compression top dead center at a start of cooling, and set to a range between 90 degrees before and after intake top dead center after warming-up.

Next, operations of the embodiment at the start of cooling will be described with reference to FIGS. 7 to 10. FIGS. 7 to 10 show states in central sections of the combustion chamber.

When an engine key is turned on, a signal is first transmitted from the water temperature sensor 20 to the CPU 30 to detect water temperature, and a signal is transmitted from the crank angle sensor 19 to the CPU 30 to detect an engine rpm, according to the program stored in the ROM 31.

When the water temperature is less than 80° C., it is determined as cooling time, and two time injection is determined. In the cooling time, if the engine rpm is less than 1500 r/min, first fuel injection timing is set to 10 degrees BTDC, and if the engine rpm is 1500 r/min or more, the first fuel injection timing is set to 20 degrees BTDC. Second injection timing is set to the same timing as the ignition timing. Here, the engine rpm is less than 1500 r/min, the first fuel injection timing is 10 degrees BTDC, and the second fuel injection timing and the ignition timing are 30 degrees ATDC.

At the start of cooling, fuel injection amounts of several cycles from initial explosion are previously recorded in the ROM 31. The fuel pressure sensor 28 detects fuel pressure, and a signal thereof is transmitted from the input circuit 33 to the RAM 32. Map data that determines an injection pulse width from the fuel pressure and the fuel injection amount is previously recorded in the ROM 31, and the CPU 30 determines a pulse width based on the fuel pressure. The fuel injection amount is set so that a ratio between an amount of air taken into the combustion chamber and the sum of the first and second injection amounts is 16.

A state of an inside of the combustion chamber 50 immediately after the first fuel injection is shown in FIG. 7. The upward spray 10 is generated from the injection hole 13a of the multi-hole injector 9, and the injection hole 13a is oriented substantially immediately laterally (horizontally). Thus, the spray of fuel by the upward spray 10 advances below the ignition plug 4. On the other hand, the central spray 11 is oriented downward, and thus collides with the crown surface 3A of the piston 3.

In the combustion chamber 50, the spray of fuel is injected and flows, and thus the upward spray 10 forms airflow from the intake side toward the exhaust side, and the central spray 11 forms airflow toward the piston 3. The airflow toward the piston 3 collides with the crown surface 3A of the piston 3, and becomes airflow flowing on the piston crown surface 3A toward the exhaust side.

Figure 8:
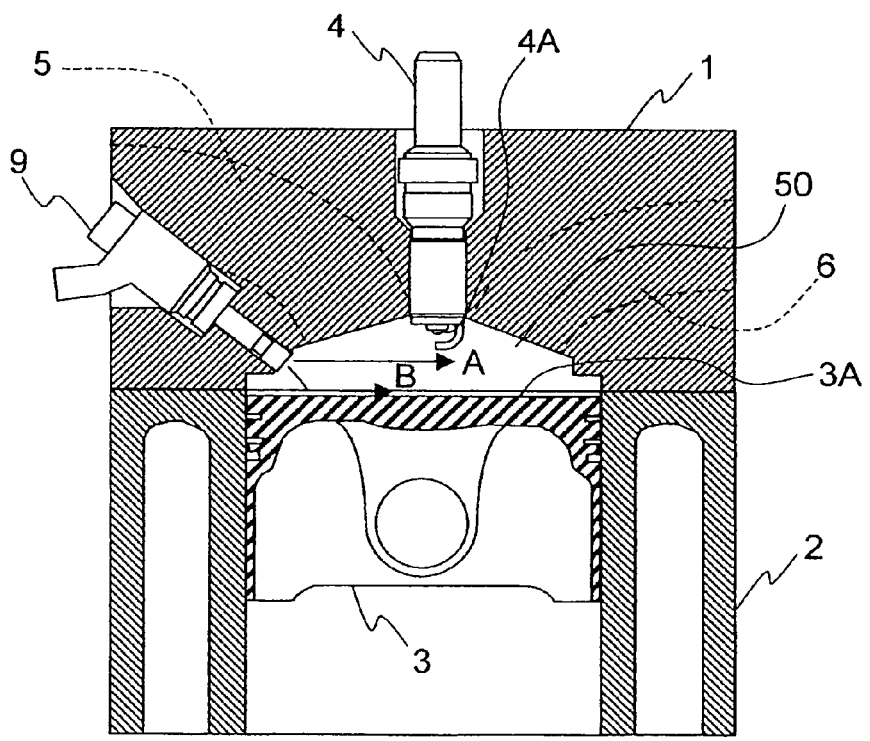
FIG. 8 illustrates an outline of airflow in the first embodiment.

Thus, as shown in FIG. 8, in the combustion chamber 50, the upward spray 10 forms airflow A from the side of the multi-hole injector 9 (the intake side) toward the exhaust side, and airflow B retarded from the airflow A and along the piston crown surface 3A toward the exhaust side.

Near piston top dead center, the inside of the combustion chamber 50 is high in temperature, and the fuel is easily vaporized. The upward spray 10 passes below the electrode portion 4A of the ignition plug 4, the central spray 11 slides on the crown surface 3A of the piston 3, and the upward spray 10 and the central spray 11 advance while forming air/fuel mixture.

Figure 9:
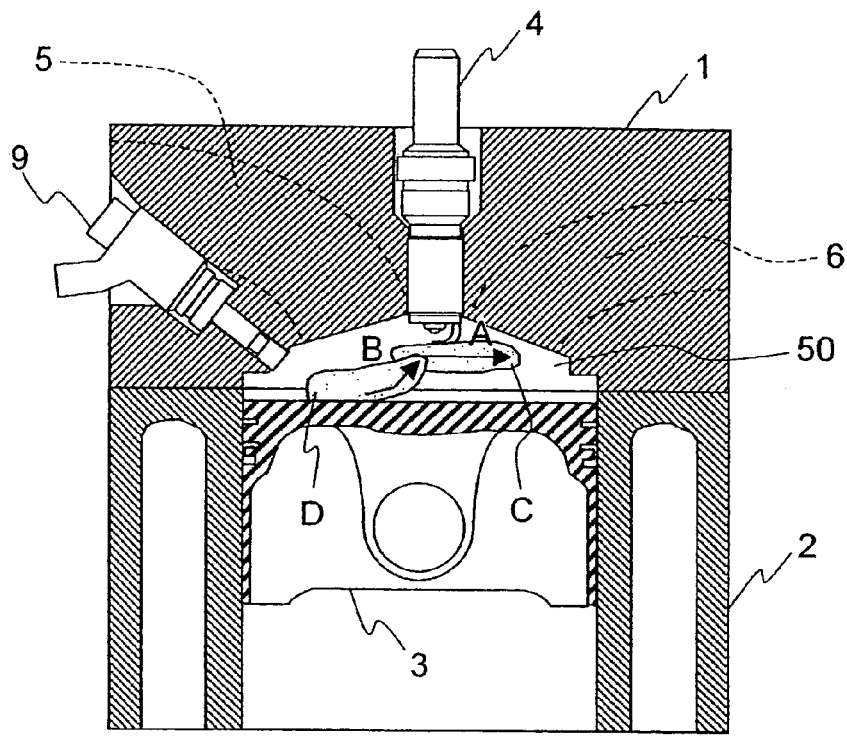
FIG. 9 illustrates a state of air/fuel mixture in a combustion chamber in the first embodiment.

A state of air/fuel mixture in the combustion chamber at around 10 degrees ATDC is shown in FIG. 9. Air/fuel mixture C vaporized from the upward spray 10 is placed below the electrode portion 4A of the ignition plug 4, and air/fuel mixture D vaporized from the central spray 11 is placed near the crown surface 3A of the piston 3.

The central spray 11 collides with the crown surface 3A of the piston 3, and thus the airflow B is attenuated and weaker than the airflow A. Specifically, the upward spray 10 generates the airflow A faster than the airflow B by the central spray 11. Thus, pressure is lower than surroundings behind the airflow A, and the air/fuel mixture D vaporized from the central spray 11 is lifted by the airflow A (by a sucking effect of the airflow) as shown in FIG. 9.

Figure 10:
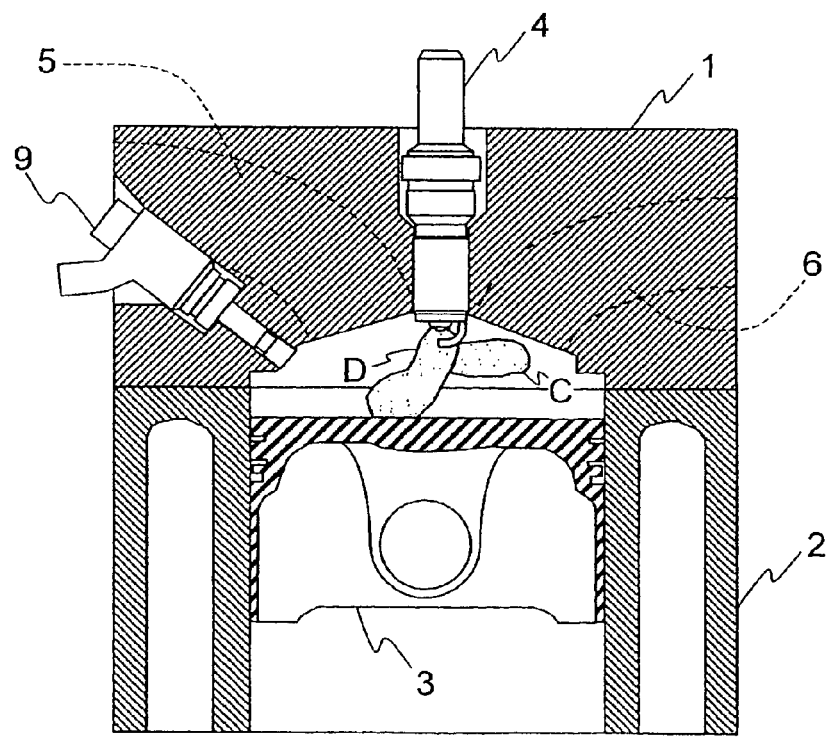
FIG. 10 illustrates a state of the air/fuel mixture at ignition timing in the first embodiment.

A state of air/fuel mixture at 30 degrees ATDC that is ignition timing is shown in FIG. 10. The inside of the combustion chamber 50 is high in pressure, and thus the air/fuel mixture C slows down around a position just passing the electrode portion 4A of the ignition plug 4, and the air/fuel mixture D also slows down around the electrode portion 4A of the ignition plug 4 after lifted by the airflow A.

Thus, even if the ignition timing is significantly retarded, ignition can be performed to allow early increase in exhaust gas temperature by ignition retard at the start of cooling.

Figure 12:
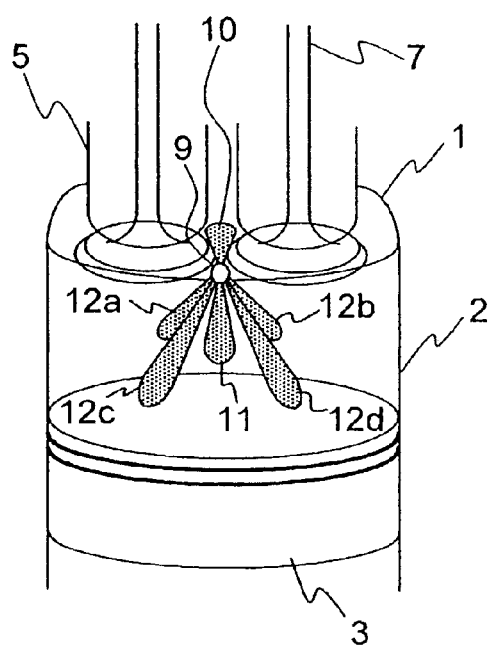
FIG. 12 illustrates a state of sprays seen from the injector in the first embodiment.
Figure 13:
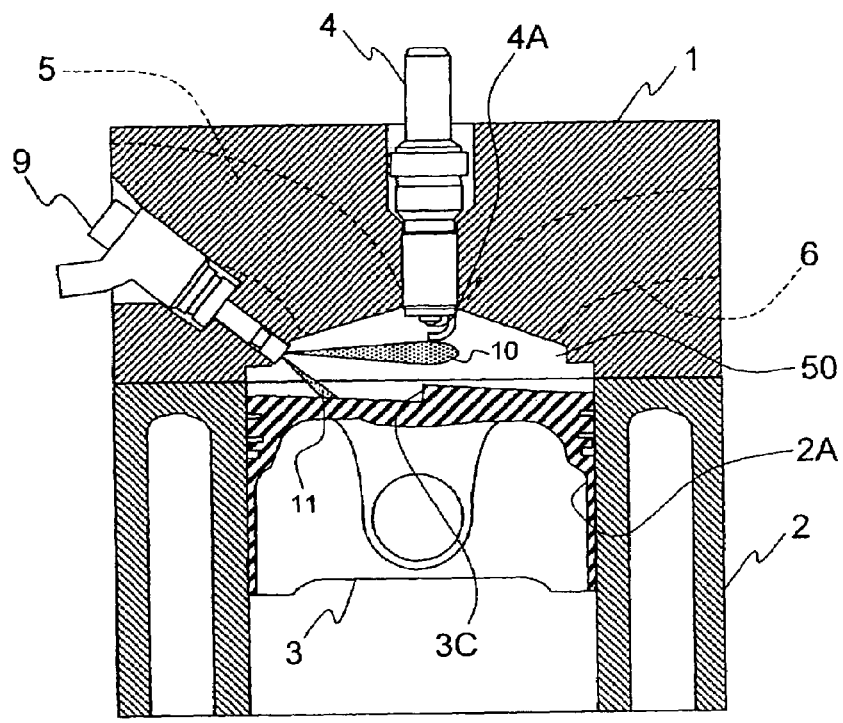
FIG. 13 is a vertical sectional view of an engine body of a second embodiment of a cylinder direct gasoline injection type internal combustion engine according to the present invention.

Next, operations in full open operation will be described with reference to FIGS. 11 to 13. When the accelerator pedal 21 is depressed, a signal is transmitted from the accelerator opening degree sensor 22 to the CPU 30 to detect an accelerator opening degree. Similarly, a signal is transmitted from the crank angle sensor 19 to the CPU 30 to detect an engine rpm.

The CPU 30 determines required load according to the accelerator opening degree and the engine rpm, and controls an opening degree of the throttle valve 23. The fuel injection amount is set so that a ratio between air taken in and fuel to be injected is around 1:13. The fuel injection timing is determined by the map data of the required load and the engine rpm recorded in the ROM 31. In the embodiment, the engine rpm is set to 90 degrees ATDC at 2000 r/min under a full open operation condition.

FIG. 11 shows a state of the injector immediately after the fuel injection and the inside of the combustion chamber 50 seen from a lateral side. FIG. 11 shows a state of the inside of the combustion chamber 50 seen from the multi-hole injector 9. At around 90 degrees ATDC, a lift amount of the intake valve 7 is maximum.

In the embodiment, the upward spray 10 and the central spray 11 are positioned on the central section of the combustion chamber 50, and the lateral sprays 12a to 12d are injected outside a range of operation of the intake valve 7, and do not collide with the intake valve 7.

After the fuel injection, the fuel is mixed with air to form uniform air/fuel mixture. In the embodiment, the spray injected toward the ignition plug 4 is the upward spray 10 only, and the central spray 11 and the lateral sprays 12a to 12d are injected downward so as to increase distances to a wall surface of the combustion chamber, thereby minimizing adhesion of the sprays to the wall surface.

This increases fuel mixed with air, and a cooling effect of air by vaporization increases charging efficiency and allows high output operation by ignition timing advance.

Thus, according to the embodiment, reduction in exhaust by increase in exhaust gas temperature at a start of cooling and early activation of a catalyst, and high output operation under a full open condition are balanced.

A second embodiment of a cylinder direct gasoline injection type internal combustion engine according to the present invention will be described with reference to FIG. 13. In FIG. 13, components corresponding to FIG. 1 are denoted by the same reference numerals as in FIG. 1, and descriptions thereof will be omitted.

In this embodiment, a step 3C is formed in a crown surface of a piston 3 so that the crown surface is positioned below (immediately below) an ignition plug 4. The step 3C is low on an intake side and high on an exhaust side, and forms a barrier (a vertical wall) when the exhaust side is seen from the intake side.

Figure 14:
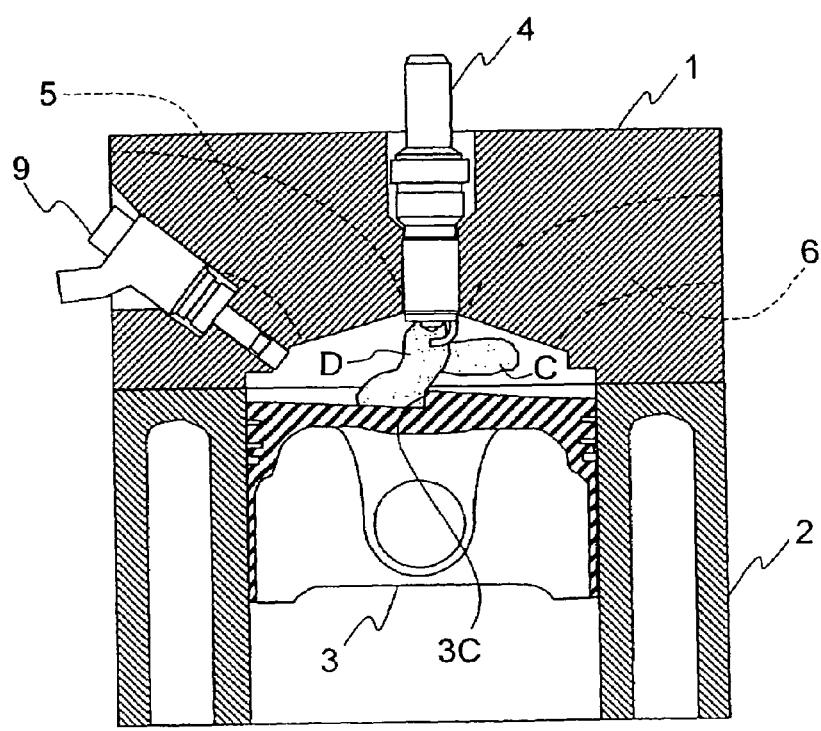
FIG. 14 illustrates a state of air/fuel mixture at ignition timing in the second embodiment.

In the embodiment, under a condition at a start of cooling as in the first embodiment, airflow A generated by an upward spray 10 causes air/fuel mixture D from a central spray 11 to be lifted upward. Further, as shown in FIG. 14, the air/fuel mixture D collides with the step 3C, and the step 3C causes the air/fuel mixture D to be lifted toward an electrode portion 4A of the ignition plug 4.

This provides an advantage that the air/fuel mixture D can easily reach the electrode portion 4A of the ignition plug 4 with higher stability against cycle variation, individual variation in sprays, or shot variation.

Figure 15:
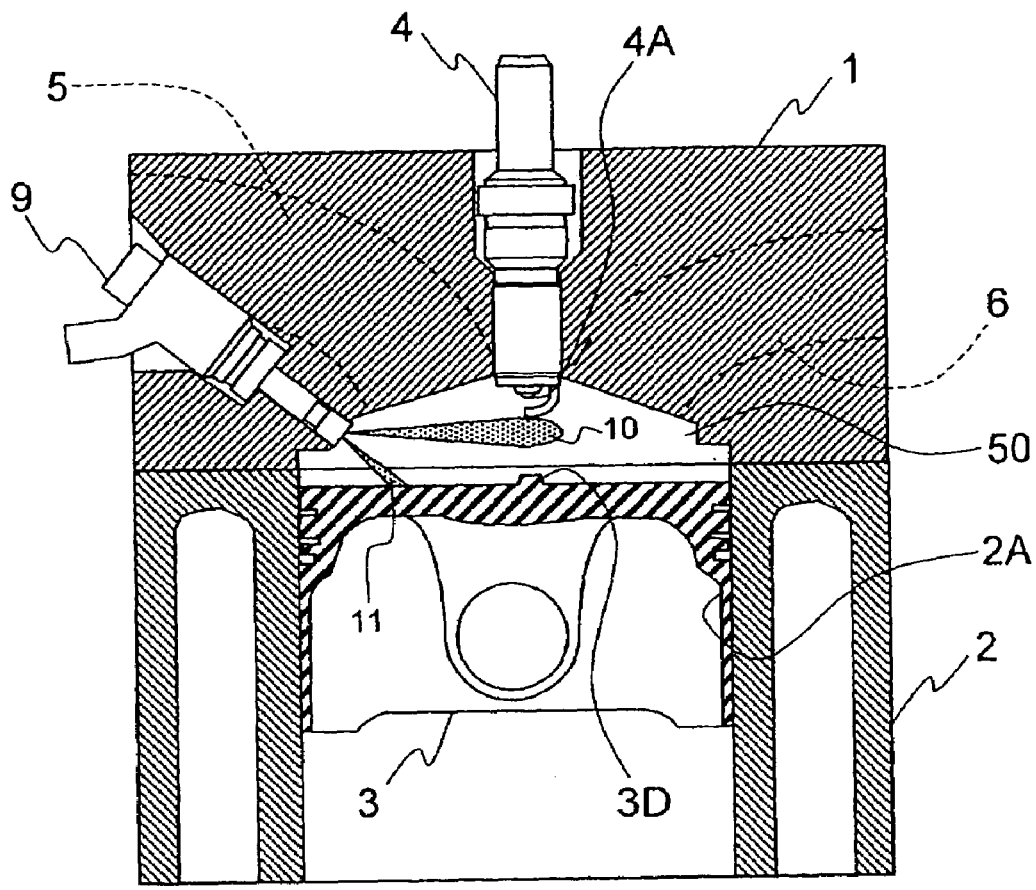
FIG. 15 is a vertical sectional view of an engine body of a third embodiment of a cylinder direct gasoline injection type internal combustion engine according to the present invention.

A third embodiment of a cylinder direct gasoline injection type internal combustion engine according to the present invention will be described with reference to FIG. 15. Also in FIG. 15, components corresponding to FIG. 1 are denoted by the same reference numerals as in FIG. 1, and descriptions thereof will be omitted.

In this embodiment, a ridge (a protrusion) 3D is formed in a crown surface of a piston 3 so that the crown surface is positioned below (immediately below) an ignition plug 4.

Also in this embodiment, under a condition at a start of cooling as in the first embodiment, airflow A generated by an upward spray 10 causes air/fuel mixture D from a central spray 11 to be lifted upward. Further, the air/fuel mixture (the air/fuel mixture equivalent to the air/fuel mixture D in FIG. 14) collides with the ridge 3D, and the ridge 3D causes the air/fuel mixture to be lifted toward an electrode portion 4A of the ignition plug 4.

This provides an advantage that the air/fuel mixture D can easily reach the electrode portion 4A of the ignition plug 4 with higher stability against cycle variation, individual variation in sprays, or shot variation also in this embodiment.

Figure 2:
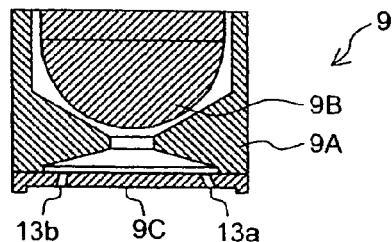
FIG. 2A is an enlarged sectional view of a tip of a multi-hole injector used in the cylinder direct gasoline injection type internal combustion engine according to the first embodiment.
FIG. 2B is an enlarged plan view of a multi-hole plate of the multi-hole injector used in the cylinder direct gasoline injection type internal combustion engine according to the first embodiment.
Figure 2:
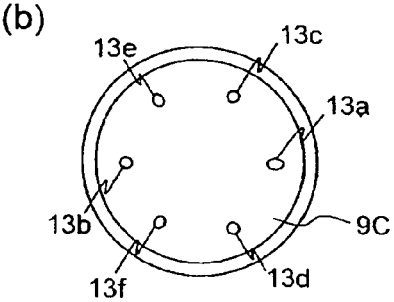

A multi-hole injector used in a fourth embodiment of a cylinder direct gasoline injection type internal combustion engine according to the present invention will be described with reference to FIGS. 16 to 19. In FIGS. 16 to 19, components corresponding to FIGS. 2 to 4 are denoted by the same reference numerals as in FIGS. 2 to 4, and descriptions thereof will be omitted.

Figure 16:
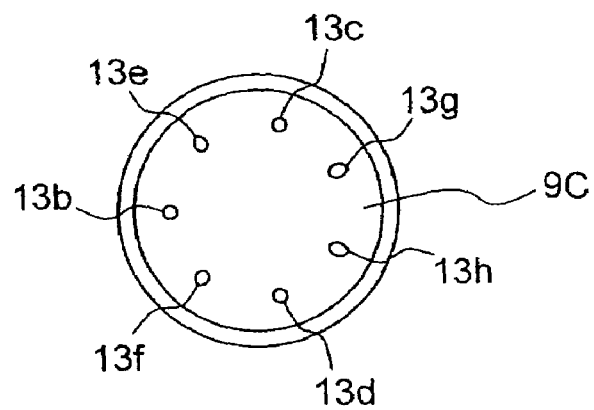
FIG. 16 is an enlarged plan view of a multi-hole plate of a multi-hole injector used in a fourth embodiment of a cylinder direct gasoline injection type internal combustion engine according to the present invention.

In this embodiment, as shown in FIG. 16, seven injection holes 13b to 13h are formed in a circumference of a multi-hole plate 9C. The injection holes 13g and 13h are intended for upward sprays, the injection hole 13b is intended for a central spray, and the injection holes 13c to 13f are intended for lateral sprays. Specifically, in the embodiment, two upward spray injection holes are provided.

Figure 17:
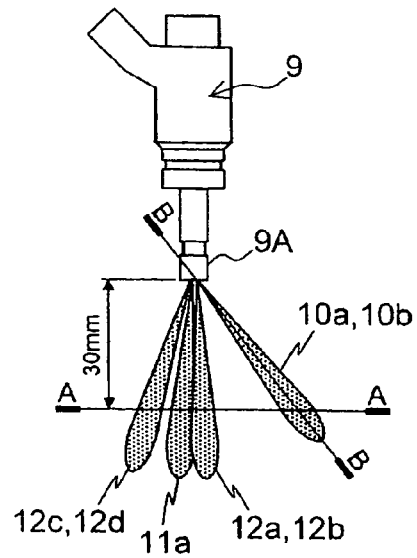
FIG. 17 illustrates appearance shapes of sprays in the fourth embodiment.
Figure 18:
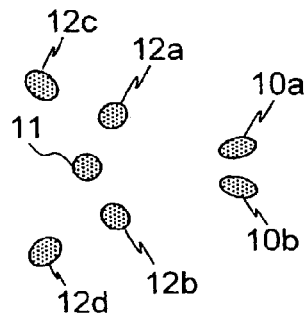
FIG. 18 illustrates horizontal sectional shapes of the sprays in the fourth embodiment.

FIGS. 17 and 18 show appearance shapes of sprays of fuel when the fuel is injected from the multi-hole injector 9 into a free space where ambient pressure is atmospheric pressure at fuel pressure of 11 MPa. FIG. 17 shows shapes of sprays when the multi-hole injector 9 is seen from a lateral side, and FIG. 18 shows shapes of sprays in a section taken along the line A-A in FIG. 17, 30 mm below the injection holes 1 ms after the fuel injection.

In FIGS. 17 and 18, reference numerals 10a and 10b denote upward sprays from the injection holes 13g and 13h, reference numeral 11 denotes a central spray from the injection hole 13b, and reference numerals 12a to 12d denote lateral sprays from the injection holes 13c to 13f.

The multi-hole injector 9 is placed so that the upward sprays 10a and 10b are placed on an upper side of a combustion chamber 50 (a side of a cylinder head 1) and closer to an ignition plug 4.

Figure 19:
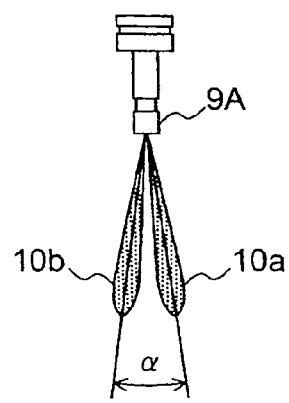
FIG. 19 illustrates a definition of an angle α between upward sprays in the fourth embodiment.

Shapes of the upward sprays 10a and 10b in a section taken along the line B-B in FIG. 17 are shown in FIG. 19. When a spray angle α formed between the upward sprays 10a and 10b is small, the sprays interfere with each other to increase penetration of the sprays, and fuel droplets adhere to wall surfaces of the cylinder head 1 and the cylinder block 2 to prevent exhaust. On the other hand, when the spray angle α is large, airflow A generated by the upward sprays 10a and 10b is not oriented below the ignition plug, thereby preventing the air/fuel mixture D (see FIG. 9) from being successfully carried to an electrode portion 4A of the ignition plug 4. Thus, the spray angle α is preferably 10° to 30°.

Other configurations are the same as in the first embodiment, and descriptions thereof will be omitted.

In this embodiment, the number of upward sprays is increased from one to two to increase a percentage of the upward sprays to the entire sprays from 17% to 29%, thereby strengthening the airflow A generated by the upward sprays 10a and 10b.

Thus, the air/fuel mixture D is more easily lifted toward the electrode portion 4A of the ignition plug 4 under a condition at a start of cooling, with higher stability in combustion. This allows ignition even if ignition timing is significantly retarded, and allows early increase in exhaust gas temperature by ignition retard at the start of cooling.

A multi-hole injector used in a fifth embodiment of a cylinder direct gasoline injection type internal combustion engine according to the present invention will be described with reference to FIGS. 20 to 22. Also in FIGS. 20 to 22, components corresponding to FIGS. 2 to 4 are denoted by the same reference numerals as in FIGS. 2 to 4, and descriptions thereof will be omitted.

Figure 20:
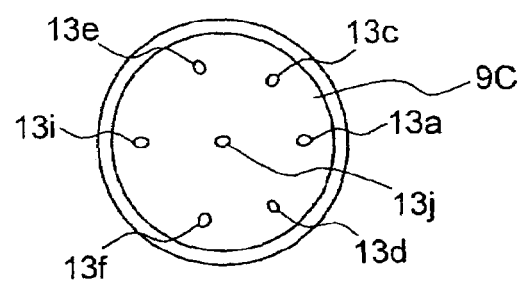
FIG. 20 is an enlarged plan view of a multi-hole plate of a multi-hole injector used in a fifth embodiment of a cylinder direct gasoline injection type internal combustion engine according to the present invention.

In this embodiment, as shown in FIG. 20, seven injection holes 13a, 13c to 13f, 13i and 13j are formed in a circumference of a multi-hole plate 9C. The injection hole 13a is intended for an upward spray, the injection holes 13i and 13j are intended for central sprays, and the injection holes 13c to 13f are intended for lateral sprays. Specifically, in the embodiment, two central spray injection holes are provided.

Figure 21:
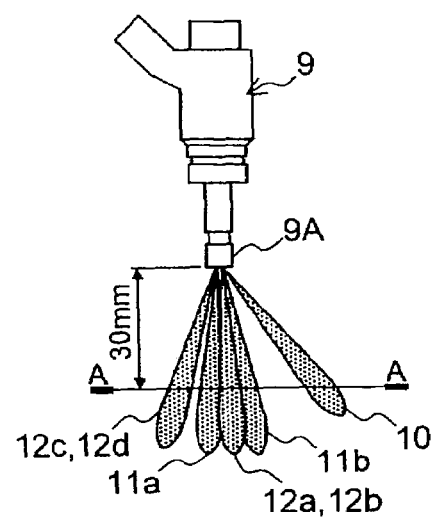
FIG. 21 illustrates appearance shapes of sprays in the fifth embodiment.
Figure 22:
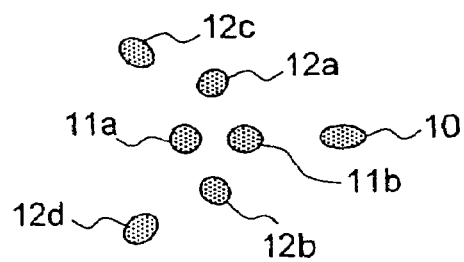
FIG. 22 illustrates horizontal sectional shapes of the sprays in the fifth embodiment.

FIG. 21 and FIG. 22 show appearance shapes of sprays of fuel when the fuel is injected from the multi-hole injector 9 into a free space where ambient pressure is atmospheric pressure at fuel pressure of 11 MPa. FIG. 21 shows shapes of sprays when the multi-hole injector 9 is seen from a lateral side, and FIG. 22 shows shapes of sprays in a section taken along the line A-A in FIG. 21, 30 mm below the injection holes 1 ms after the fuel injection.

In FIGS. 21 and 22, reference numeral 10 denotes an upward spray from the injection hole 13a, reference numerals 11a and 11b denote central sprays from the injection holes 13i and 13j, and reference numerals 12a to 12d denote lateral sprays from the injection holes 13c to 13f.

Also in this embodiment, the multi-hole injector 9 is placed so that the upward spray 10 is placed on an upper side of a combustion chamber 50 (a side of a cylinder head 1) and closer to an ignition plug 4.

Other configurations are the same as in the first embodiment, and descriptions thereof will be omitted.

Figure 23:
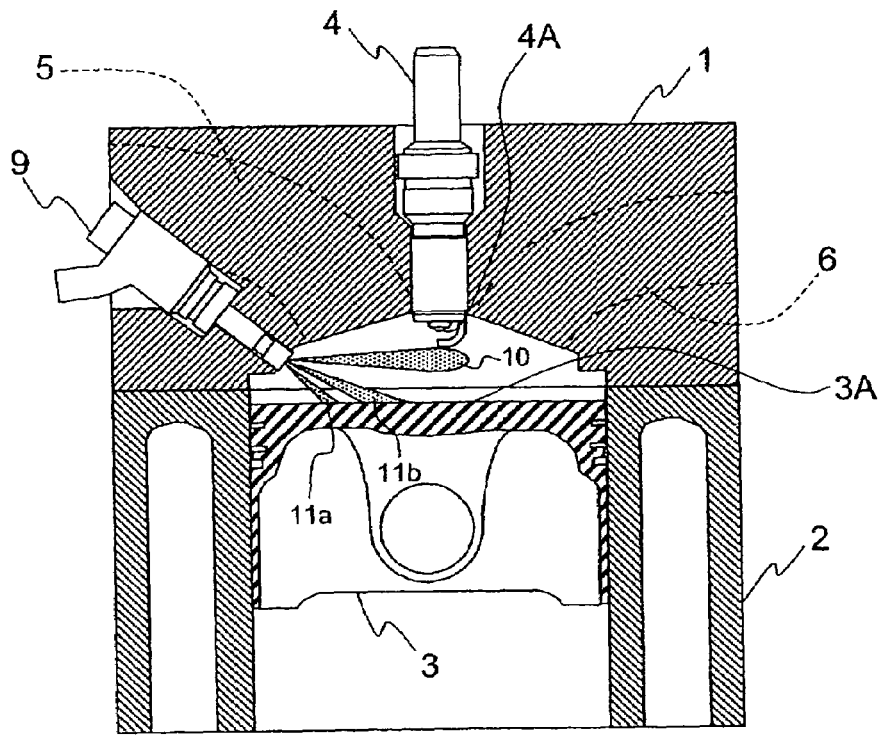
FIG. 23 illustrates a state immediately after fuel injection in the fifth embodiment.

A state of an inside of the combustion chamber immediately after first fuel injection in the embodiment is shown in FIG. 23. In this embodiment, the number of central sprays is increased from one to two to increase a percentage of the central sprays 11a and 11b to the entire sprays from 17% to 29%, while a percentage of the upper spray 10 is reduced from 17% to 14%.

Thus, as compared with the first embodiment, airflow A (see FIG. 8) generated by the upward spray 10 is weak, and airflow B (see FIG. 8) generated by the central sprays 11a and 11b is strong.

Figure 24:
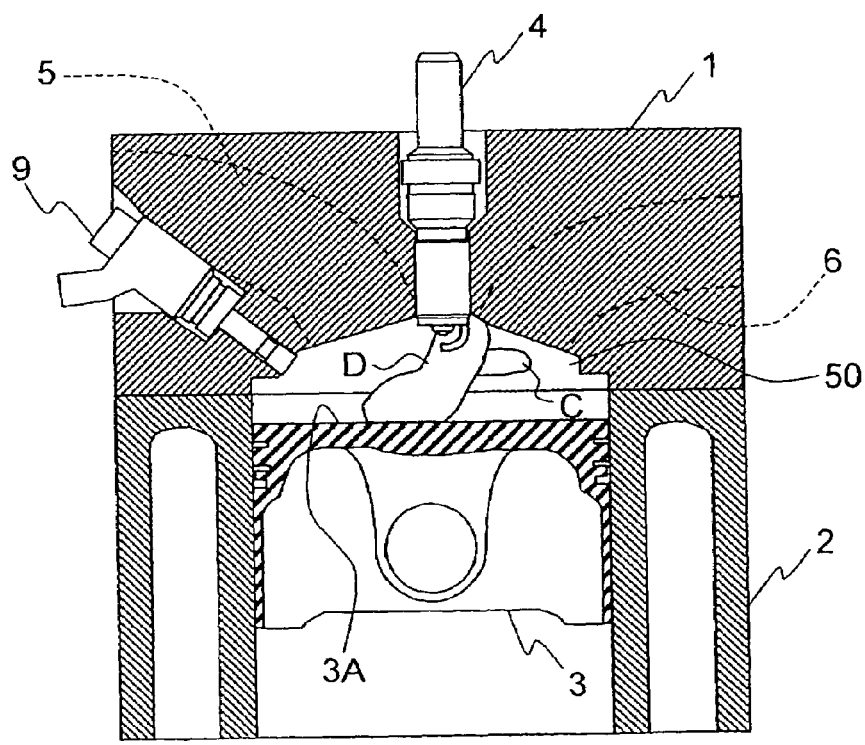
FIG. 24 illustrates a state of air/fuel mixture at ignition timing in the fifth embodiment.

A state of air/fuel mixture in the combustion chamber at around 10 degrees ATDC in the embodiment 5 is shown in FIG. 24. Air/fuel mixture C vaporized from the upward spray 10 is placed below an electrode portion 4A of the ignition plug 4, and air/fuel mixture D vaporized from the central sprays 11a and 11b is placed near a crown surface 3A of a piston 3. The airflow B is strengthened to cause the air/fuel mixture D to be sprayed upward at a point remote from the multi-hole injector 9.

The increase in the percentage of the central sprays 11a and 11b increases fuel concentration of the air/fuel mixture D, and allows the air/fuel mixture D to be distributed to a wide range. Increase in fuel concentration at an electrode position of the ignition plug 4 at ignition timing has an advantage of stabilizing ignition against cycle variation or variation in sprays.

In this embodiment, the piston 3 according to the second or third embodiment is used to further increase the advantage.

Figure 25:
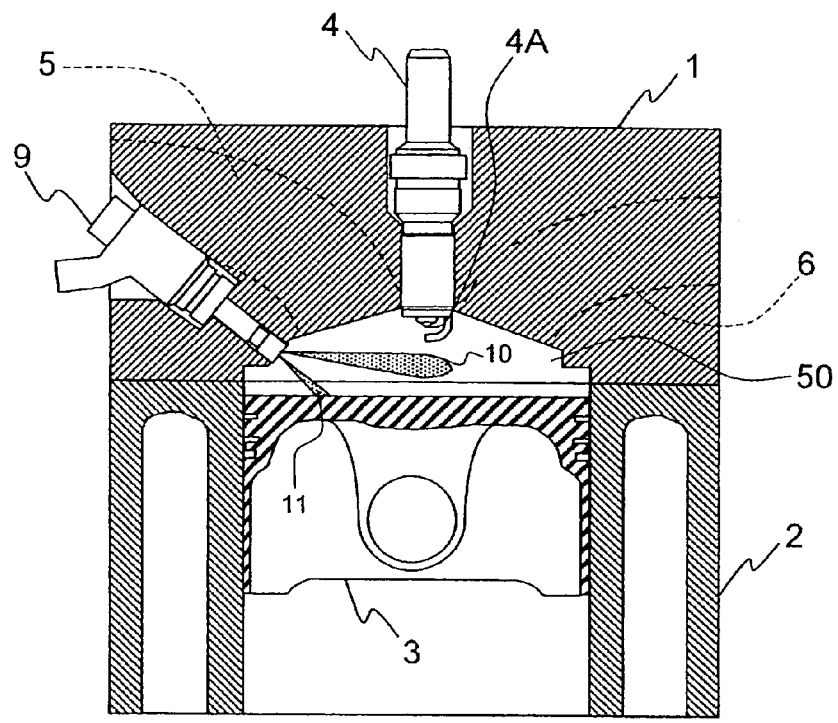
FIG. 25 is a vertical sectional view of an engine body of a sixth embodiment of a cylinder direct gasoline injection type internal combustion engine according to the present invention.

A sixth embodiment of a cylinder direct gasoline injection type internal combustion engine according to the present invention will be described with reference to FIG. 25. In FIG. 25, components corresponding to FIG. 1 are denoted by the same reference numerals as in FIG. 1, and descriptions thereof will be omitted.

In this embodiment, in order to prevent an upward spray 10 from colliding with an electrode portion 4A of an ignition plug 4, the upward spray 10 is oriented downward to an angle such that the upward spray 10 does not collide with the cylinder head 1.

Figure 26:
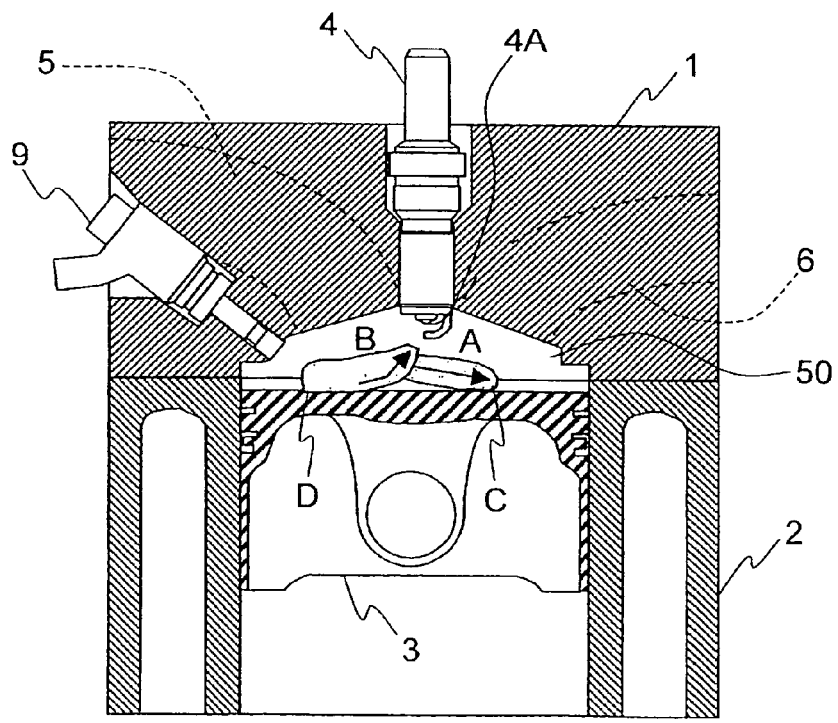
FIG. 26 illustrates a state of air/fuel mixture in a combustion chamber in the sixth embodiment.

As shown in FIG. 26, airflow A generated by the upward spray 10 is placed closer to a piston 3 than that in the first embodiment, but closer to the ignition plug 4 than airflow B generated by a central spray 11. Thus, also in this embodiment, air/fuel mixture D is lifted toward the ignition plug 4, thereby allowing ignition retard. Fuel injection is thus performed at the angle such that the upward spray 10 does not collide with the cylinder head 1, thereby reducing fuel adhering to the cylinder head 1 under a full open condition, and reducing exhaust of unburned fuel.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A cylinder direct gasoline injection type internal combustion engine that directly injects fuel into a combustion chamber having a cylinder head, comprising:
   an injector that injects fuel into the combustion chamber on an intake side of the combustion chamber,
   wherein the injector comprises:
   an upward spray injection hole for generating an upward spray oriented below an electrode portion of an ignition plug;
   a central spray injection hole located to generate a central spray oriented to collide with a piston and aligned in substantially the same plane below the upward spray; and
   a plurality of lateral spray injection holes for generating a plurality of lateral sprays around the central spray and oriented outside a range of operation of an intake valve, wherein, of all the fuel sprayed into the combustion chamber, the upper spray is closest to the cylinder head.

2. The cylinder direct gasoline injection type internal combustion engine according to claim 1, wherein the upward spray injection hole is so arranged that the upward spray avoids colliding with a piston crown surface as compared with the central spray, is generated closer to the electrode portion of the ignition plug, and generates airflow faster than airflow generated by the central spray.

3. The cylinder direct gasoline injection type internal combustion engine according to claim 1, wherein the plurality of lateral spray injection holes generate a lateral spray oriented between the upward spray and the central spray, and a lateral spray oriented between the central spray and the piston crown surface.

4. The cylinder direct gasoline injection type internal combustion engine according to claim 1, wherein the lateral sprays are oriented to target a crown surface outer periphery of the piston.

5. The cylinder direct gasoline injection type internal combustion engine according to claim 1, wherein the upward spray is constituted by one spray of fuel injected from one upward spray injection hole.

6. The cylinder direct gasoline injection type internal combustion engine according to claim 1, wherein the upward spray is constituted by a plurality of sprays of fuel injected from a plurality of upward spray injection holes.

7. The cylinder direct gasoline injection type internal combustion engine according to claim 1, wherein the central spray is constituted by one spray of fuel injected from one central spray injection hole.

8. The cylinder direct gasoline injection type internal combustion engine according to claim 1, wherein the central spray is constituted by a plurality of sprays of fuel injected from a plurality of central spray injection holes.

9. The cylinder direct gasoline injection type internal combustion engine according to claim 1, wherein a piston having a piston crown surface formed with a step that is low on an intake side and high on an exhaust side is used below the ignition plug.

10. The cylinder direct gasoline injection type internal combustion engine according to claim 1, wherein a piston having a piston crown surface formed with a convex portion is used below the ignition plug.

11. Control equipment of a cylinder direct gasoline injection type internal combustion engine according to claim 1,
   wherein the control equipment controls fuel injection timing so that the fuel injection timing is set to a range between 30 degrees before compression top dead center and the compression top dead center at a start of cooling, and set to a range between 90 degrees before and after intake top dead center after warming-up.

12. The cylinder direct gasoline injection type internal combustion engine according to claim 1, wherein the central spray is immediately below the upward spray.

13. An injector for a cylinder direct gasoline injection type internal combustion engine that directly injects fuel into a combustion chamber having a cylinder head, comprising:
- an upward spray injection hole for generating an upward spray oriented below an electrode portion of an ignition plug;
- a central spray injection hole located to generate a central spray oriented to collide with a piston and aligned in substantially the same plane below the upward spray; and
- a lateral spray injection hole for generating a lateral spray around the central spray and oriented outside a range of operation of an intake valve, wherein, of all the fuel sprayed into the combustion chamber, the upper spray is closest to the cylinder head.

14. The injector according to claim 13, wherein the central spray is immediately below the upward spray.

* * * * *